(12) United States Patent
Sano et al.

(10) Patent No.: US 9,073,257 B2
(45) Date of Patent: Jul. 7, 2015

(54) FILM STRETCHING MACHINE AND FILM STRETCHING METHOD

(75) Inventors: Takayoshi Sano, Fuji (JP); Satoru Nitta, Numazui (JP); Noriyuki Ohbuchi, Mishima (JP); Yoshihisa Ikeda, Shizuoka (JP); Hiromu Saijyo, Suntou-Gun (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 830 days.

(21) Appl. No.: 13/263,866

(22) PCT Filed: Apr. 9, 2010

(86) PCT No.: PCT/JP2010/056467
§ 371 (c)(1),
(2), (4) Date: Oct. 11, 2011

(87) PCT Pub. No.: WO2010/119823
PCT Pub. Date: Oct. 21, 2010

(65) Prior Publication Data
US 2012/0038080 A1    Feb. 16, 2012

(30) Foreign Application Priority Data

Apr. 14, 2009   (JP) ................................. 2009-097768

(51) Int. Cl.
*B29C 55/20* (2006.01)
*B29C 55/08* (2006.01)
B29C 55/16 (2006.01)
(52) U.S. Cl.
CPC ................. *B29C 55/20* (2013.01); *B29C 55/16* (2013.01); *B29C 55/165* (2013.01); *B29C 55/08* (2013.01)
(58) Field of Classification Search
CPC ...... B29C 55/08; B29C 55/16; B29C 55/165; B29C 55/20

USPC .............. 26/93, 94, 96; 425/325, 363, 403.1, 425/DIG. 41
See application file for complete search history.

(56) References Cited

U.S. PATENT DOCUMENTS 1,478,454 A * 12/1923 Renold ............................ 26/96
2,350,961 A *  6/1944 Haskins ........................... 26/94
(Continued)

FOREIGN PATENT DOCUMENTS

CN       201058492     5/2008
CN       101489761     7/2009
(Continued)

OTHER PUBLICATIONS

German Office Action issued in DE 11 2010 001 621.6 on Jan. 30, 2013.
(Continued)

*Primary Examiner* — Yogendra Gupta
*Assistant Examiner* — Emmanuel S Luk
(74) *Attorney, Agent, or Firm* — DLA Piper LLP US (57) ABSTRACT

A film stretching machine includes a clip chain for holding a lateral edge of a film and stretches the film while transporting the film with the clip chain holding the film and traveling, and includes an upper reference rail disposed at an upper side for guiding the clip chain; a lower reference rail disposed at a lower side for guiding the clip chain; a plurality of clips that constitutes the clip chain; an interval adjusting rail for adjusting intervals of the plurality of clips; and interval adjusting links that couple neighboring clips among the plurality of clips and contact with the interval adjusting rail to adjust the intervals of the plurality of clips. According to the film stretching machine, a stretch degree of a film can be adjusted with a simple configuration and little man-hours.

9 Claims, 7 Drawing Sheets

(56) References Cited

U.S. PATENT DOCUMENTS

| | | | |
|---|---|---|---|
| 2,923,966 | A | 2/1960 | Tooke, Jr. et al. |
| 3,054,159 | A * | 9/1962 | Mohring ............................ 26/95 |
| 3,118,212 | A * | 1/1964 | Parkinson ......................... 26/93 |
| 3,179,977 | A * | 4/1965 | Nash .............................. 16/87.2 |
| 3,195,177 | A | 7/1965 | Kawamura et al. |
| 3,276,071 | A | 10/1966 | Kazunori et al. |
| 3,305,889 | A | 2/1967 | Lewis et al. |
| 3,391,421 | A | 7/1968 | D'Onofrio et al. |
| 3,427,684 | A | 2/1969 | Tsien |
| 3,491,402 | A | 1/1970 | Koyama et al. |
| 3,555,637 | A * | 1/1971 | Hyatt ................................ 26/93 |
| 3,638,289 | A * | 2/1972 | Dornier et al. .................... 26/93 |
| 4,134,189 | A * | 1/1979 | Richter ............................. 26/89 |
| 4,637,103 | A | 1/1987 | Hutzenlaub |
| 4,807,336 | A | 2/1989 | Yoshimura et al. |
| 4,890,365 | A | 1/1990 | Langer |
| 5,081,750 | A | 1/1992 | Molz |
| 5,084,949 | A * | 2/1992 | Rutz et al. ......................... 26/72 |
| 5,161,674 | A | 11/1992 | Rutz et al. |
| 5,402,556 | A | 4/1995 | Rutz |
| 5,517,737 | A * | 5/1996 | Viltro et al. ....................... 26/88 |
| 5,613,284 | A | 3/1997 | Hosmer |
| 5,768,755 | A * | 6/1998 | Hemmerich ...................... 26/93 |
| 5,970,589 | A | 10/1999 | Hayashi et al. |
| 7,996,965 | B2 | 8/2011 | Sano et al. |
| 8,028,383 | B2 | 10/2011 | Sano et al. |
| 8,286,313 | B2 | 10/2012 | Sano et al. |
| 2008/0242824 | A1* | 10/2008 | Yoshida ........................ 527/314 |
| 2010/0221377 | A1* | 9/2010 | Sano et al. .................... 425/335 |
| 2010/0254002 | A1* | 10/2010 | Merrill et al. ................. 359/487 |
| 2011/0287224 | A1* | 11/2011 | Shirafuji et al. .............. 428/156 |
| 2012/0068376 | A1* | 3/2012 | Sano et al. .................... 264/291 |
| 2012/0243089 | A1* | 9/2012 | Araki et al. ............... 359/487.01 |
| 2012/0321782 | A1* | 12/2012 | Hada et al. .................... 427/162 |

FOREIGN PATENT DOCUMENTS

| | | |
|---|---|---|
| CN | 102893129 | 1/2013 |
| DE | 1504823 | 4/1969 |
| DE | 42 41 213 | 6/1994 |
| EP | 0 291 775 | 5/1988 |
| GB | 2238748 | 6/1991 |
| JP | 44-7155 | 3/1969 |
| JP | 59-049939 | 3/1984 |
| JP | 59-067017 | 4/1984 |
| JP | 61-058723 | 3/1986 |
| JP | 61-124462 | 6/1986 |
| JP | 62-211124 | 9/1987 |
| JP | 63-042839 | 2/1988 |
| JP | 64-53177 | 3/1989 |
| JP | 64-085736 | 3/1989 |
| JP | 02-095825 | 4/1990 |
| JP | 04-128028 | 4/1992 |
| JP | H6-34931 | 5/1994 |
| JP | 2003-236927 | 8/2003 |
| JP | 2004-122640 | 4/2004 |
| JP | 2006-205409 | 8/2006 |
| JP | 2007-230143 | 9/2007 |
| JP | 2008-044339 | 2/2008 |
| TW | 200821134 | 7/1996 |
| TW | 200827145 | 7/1996 |
| TW | 200848247 | 1/1997 |

OTHER PUBLICATIONS

Translation of German Office Action issued in DE 11 2010 001 621.6 on Jan. 30, 2013.
English Language Abstract of EP 0 291 775 published on Nov. 23, 1988.
Korean Office Action issued in 10-2011-7023476 on Apr. 1, 2013.
English Language Translation of Korean Office Action issued in 10-2011-7023476 on Apr. 1, 2013.
Taiwanese Office Action issued in TW099111423 on Jan. 21, 2013.
English Language Translation of Taiwanese Office Action issued in TW099111423 on Jan. 21, 2013.
International Search Report of PCT/JP2007/064066 issued Oct. 16, 2007.
English Language translation of JP-2003-236927 published Aug. 26, 2003.
English abstract of JP 2003-236927 published Aug. 26, 2003.
English Language translation of JP-2004-122640 published Apr. 22, 2004.
English abstract of JP 2004-122640 published Apr. 22, 2004.
English abstract of JP-61-058723 published Mar. 26, 1986.
English abstract of JP-59-049939 published Mar. 22, 1984.
English abstract of JP-59-067017 published Apr. 16, 1984.
Taiwanese Office Action issued in Application No. 96126405 mailed Dec. 3, 2008.
English Abstract of Taiwanese Office Action issued in Application No. 96126405 mailed Dec. 3, 2008.
English abstract of JP-64-053177 published Mar. 1, 1989.
Search Report of International Application No. PCT/JP2008/050507 issued Apr. 8, 2008.
Machine English language translation of JP-2006-205409 published Aug. 10, 2006.
English language Abstract of JP-2006-205409 published Aug. 10, 2006.
English language Abstract of Japanese Patent Post-Examined Publication No. 44-07155 Published Mar. 1969.
German Office Action issued in DE Appl 11 2007 001 696.5-16 on Jun. 4, 2010.
English Translation of German Office Action issued in DE Appl 11 2007 001 696.5-16 on Jun. 4, 2010.
U.S. Appl 12/374,260.
U.S. Appl 12/524,111.
Office Action issued in JP 2007-012473 on Oct. 26, 2010.
English Translation of Japanese Office Action issued in JP 2007-012473 on Oct. 26, 2010.
English Abstract of JP 04-128028 published Apr. 28, 1992.
English Abstract of JP 63-042839 published Feb. 24, 1988.
Office Action issued in CN 200780027246.6 on Aug. 12, 2010.
English Translation of Office Action issued in CN 200780027246.6 on Aug. 12, 2010.
Office Action issued in German Appl 11 2008 000 240.1-16 on Oct. 5, 2010.
English Translation of Office Action issued in German Appl 11 2008 000 240.1-16 on Oct. 5, 2010.
English Abstract of JP 2008-044339 published Feb. 28, 2008.
English Translation of JP 2008-044339 published Feb. 28, 2008.
Korean Office Action issued in 10-2009-7015492 on Apr. 15, 2011.
English Language Translation of Korean Office Action issued in 10-2009-7015492 on Apr. 15, 2011.
Office Action issued in TW 097102008 mailed May 23, 2011.
English Translation of Office Action issued in TW 097102008 mailed May 23, 2011.
Office Action issued in CN 200880002918.2 mailed on May 18, 2011.
English Translation of Office Action issued in CN 200880002918.2 mailed on May 18, 2011.
German Office Action issued in DE 11 2007 001 696.5 on Jul. 11, 2011.
English Language Translation of German Office Action issued in DE 11 2007 001 696.5 on Jul. 11, 2011.
German Office Action issued in DE 11 2008 000 240.1 on Dec. 28, 2011.
English Language Translation of German Office Action issued in De 11 2008 000 240.1 on Dec. 28, 2011.
International Search Report issued in PCT/JP2010/056467 on Jun. 15, 2010 (with English Translation).
English Language Abstract of JP 64-085736 published Mar. 30, 1989.
English Language Abstract of JP 61-124462 published Jun. 12, 1986.
English Language Abstract of JP 62-211124 published Sep. 17, 1987.
English Language Abstract of JP 02-095825 published Apr. 6, 1990.
English Language Abstract of JP 06-034931 published May 10, 1994.

(56) References Cited

OTHER PUBLICATIONS

English Language Translation of JP 06-034931 published May 10, 1994.
English Language Abstract of JP 2007-230143 published Sep. 13, 2007.
English Language Translation of JP 2007-230143 published Sep. 13, 2007.
Chinese Office Action issued in 201080016570.x on Sep. 29, 2013.
English Language Translation of Chinese Office Action issued in 201080016570.x on Sep. 29, 2013.
English Language Abstract of CN 102893129 published Jan. 23, 2013.
English Language Abstract of CN 101489761 published Jul. 22, 2009.
English Language Abstract of CN 201058492 published May 14, 2008.

* cited by examiner

FILM STRETCHING MACHINE AND FILM STRETCHING METHOD

TECHNICAL FIELD

The present invention relates to a film stretching machine in which edges of a film are held by clip chains, and the film is transported and stretched while the clip chains are traveled. In addition, the present invention relates to a film stretching method that utilizes the above film stretching machine.

BACKGROUND ART

Conventionally, a simultaneous biaxial stretching machine that uses clip chains configured with link mechanisms and initially-folding chain devices (initially-folding roller chain devices) and adjusts a stretch degree of a film while holding the film is known (for example, see Japanese Patent Application Laid-Open No. H2-95825 [Patent Document 1]).

In addition, a film stretching machine that uses clip chains configured with plural clips sequentially coupled by coupling members and interval adjusting rails (guide rails) and adjusts a stretch degree of a held film while holding the film is known (for example, see Japanese Patent Application Laid-Open No. S62-211124 [Patent Document 2]).

DISCLOSURE OF THE INVENTION

However, in the simultaneous biaxial stretching machine disclosed in patent Document 1, the link mechanisms are used and the initially-folding chain devices for reducing intervals between holders of the clip chains are provided in order to adjust a stretch degree of a film, resulting in a complicated machine configuration.

In the film stretching machine disclosed in patent Document 2, a stretch degree of a film is adjusted by contacting portions of the coupling member with the interval adjusting rail to reduce intervals of the clips. However, the coupling member contacts with the interval adjusting rail at its upper portion and its lower portion, resulting in a complicated machine configuration requiring many man-hours for adjusting the machine.

It is an object of the present invention to provide a film stretching machine that can adjust a stretch degree of a film with a simple configuration and little man-hours, and to provide a film stretching method that utilizes the film stretching machine.

A first aspect of the present invention provides a film stretching machine that includes a clip chain for holding a lateral edge of a film and stretches the film while transporting the film with the clip chain holding the film and traveling, and includes an upper reference rail disposed at an upper side for guiding the clip chain; a lower reference rail disposed at a lower side for guiding the clip chain; a plurality of clips that constitutes the clip chain; an interval adjusting rail for adjusting intervals of the plurality of clips; and interval adjusting links that couple neighboring clips among the plurality of clips and contact with the interval adjusting rail to adjust the intervals of the plurality of clips.

According to the first aspect, a stretch degree of the film can be adjusted with a simple configuration and little man-hours.

Here, it is preferable that a thickness direction of the film is set in a vertical direction, one horizontal direction thereof is set in a longitudinal direction, and another horizontal direction perpendicular to the one horizontal direction is set in a lateral direction. The clip chain is provided in a plurality, and comprises a first clip chain for holding one lateral edge of the film at plural positions along the longitudinal direction and a second clip chain for holding another lateral edge of the film at plural positions along the longitudinal direction, the upper reference rail is provided in a plurality, and comprised of a first upper reference rail for guiding the first clip chain and a second upper reference rail for guiding the second clip chain. The lower reference rail is provided in a plurality, and comprises a first lower reference rail for guiding the first clip chain and a second lower reference rail for guiding the second clip chain. The plurality of clips is constituted by a plurality of first clips that constitutes the first clip chain and a plurality of second clips that constitutes the second clip chain. The interval adjusting rail is provided in a plurality, and comprises a first interval adjusting rail for adjusting intervals of the plurality of first clips and a second interval adjusting rail for adjusting intervals of the plurality of second clips. The interval adjusting links are constituted by first interval adjusting links each couples neighboring first clips among the plurality of first clips and contacts with the first interval adjusting rail to adjust the intervals of the plurality of first clips, and second interval adjusting links each couples neighboring second clips among the plurality of second clips and contacts with the second interval adjusting rail to adjust the intervals of the plurality of second clips.

Here, it is preferable that each of the interval adjusting links includes a swing member, one side of the swing member being swingably coupled with one of the neighboring clips, and another side of the swing member being coupled with another of the neighboring clips, and the swing member swings when a portion of the swing member contacts with the interval adjusting rail to adjust the intervals of the plurality of clips.

Alternatively, it is preferable that each of the interval adjusting links includes a moving member, one side of the moving member being movably coupled with one of the neighboring clips, and another side of the moving member being movably coupled with another of the neighboring clips, and the moving member moves when a portion of the moving member contacts with the interval adjusting rail to adjust the intervals of the plurality of clips.

Alternatively, it is preferable that each of the interval adjusting links includes a first element and a second element that are provided between the neighboring clips, a base end of the first element is swingably coupled with one of the neighboring clips, and a tip end of the first member is extended toward a side of another of the neighboring clips, a base end of the second element is swingably coupled with the other of the neighboring clips, and a tip end of the second member is extended toward a side of the one of the neighboring clips and swingably coupled with the tip end of the first element, a protruded portion is provided on the second element, the protruded portion being protruded from the base end of the second element in a direction that crosses a direction connecting the base end and the tip end of the second element, and the first and second element swing when the protruded portion of the second element contacts with the interval adjusting rail to adjust the interval of the neighboring clips.

Here, it is preferable that a roller that contacts with the interval adjusting rail is provided at a tip end of the protruded portion of the interval adjusting link, and a distance between a swing center of the second element on the other of the neighboring clips and a rotational center of the roller is set larger than a distance between the swing center of the second element on the other of the neighboring clips and a communal swing center of the first and second elements.

Here, it is further preferable that the protruded portion of the interval adjusting link is pushed by the interval adjusting rail when contacting with the interval adjusting rail, and the tip end of the first element and the tip end of the second element is moved toward a side away from the film to reduce the interval of the neighboring clips.

In addition, it is preferable that a contact portion of the interval adjusting link with the interval adjusting rail is located between the upper reference rail and the lower reference rail in a vertical direction.

A second aspect of the present invention provides a film stretching method for stretching a film utilizing the above-mentioned film stretching machine.

According to the second aspect of the present invention, by utilizing a film stretching machine that includes a clip chain for holding a lateral edge of a film and stretches the film while transporting the film with the clip chain holding the film and traveling, a stretch degree of the film can be adjusted with a simple configuration and little man-hours.

BEST MODE(S) FOR CARRYING OUT THE INVENTION

First Embodiment

Figure 1:
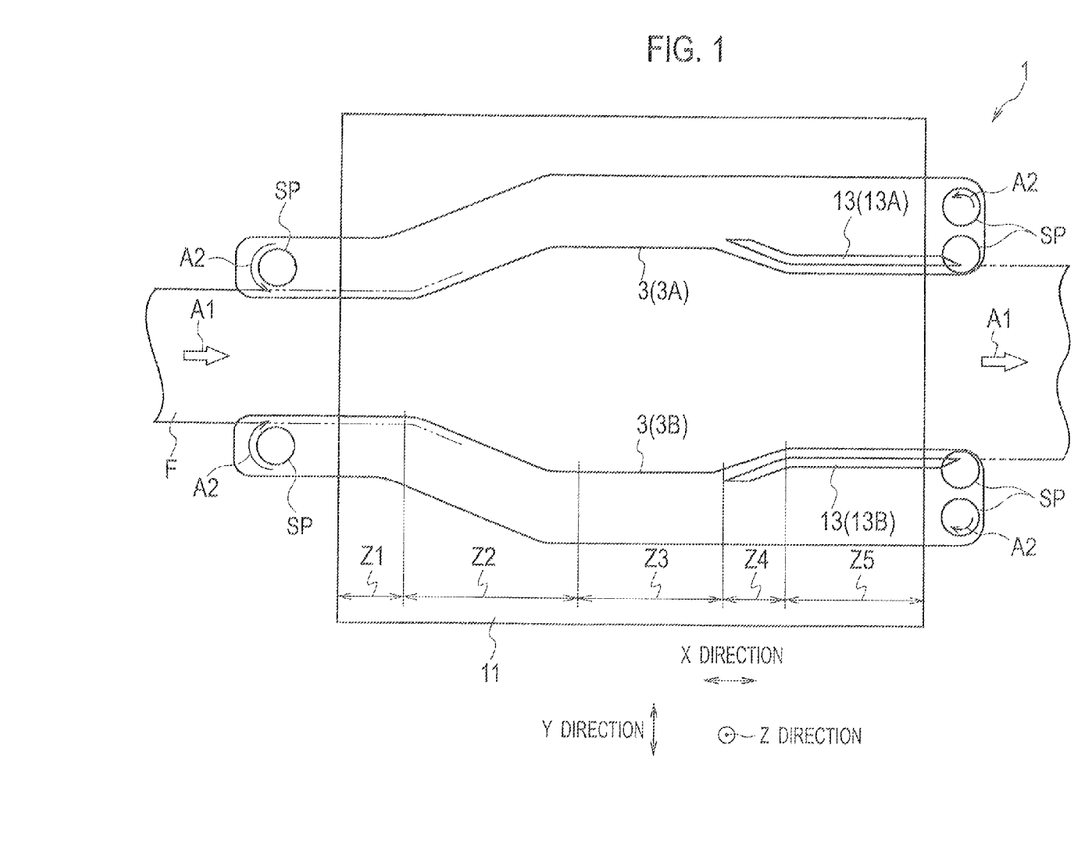
FIG. 1 is a plan view showing a schematic configuration of a film stretching machine according to a first embodiment of the present invention.
Figure 2:
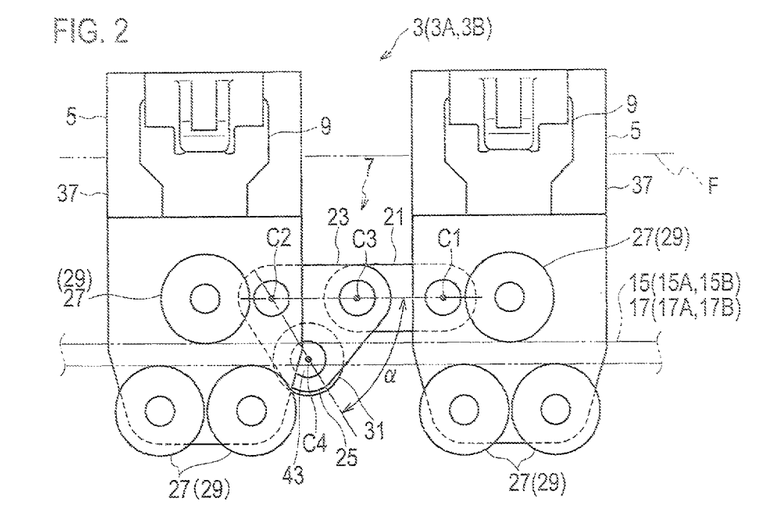
FIG. 2 is a plan view showing a schematic configuration of a clip chain in the film stretching machine.

Each clip chain 3 shown in FIG. 1 is formed circularly by arranging interval adjusting links 7 between plural clips 5. The clip chain 3 is configured by arranging the clips 5 and the interval adjusting links 7 alternately. FIG. 2 shows neighboring two of the clips 5 and one of the interval adjusting links 7 disposed therebetween.

A film stretching machine (film laterally-stretching machine) 1, while feeding a film F in a longitudinal direction (direction indicated by arrows A1 in FIG. 1; X direction), expands the film F in a lateral direction (Y direction) to stretch the film F by traveling the clip chains 3 (3A, 3B) synchronously with the clip chain 3A holding (e.g. clamping) a lateral edge of a film F and the clip chain 3B holding (e.g. clamping) another lateral edge.

With respect to the film F that is held by the clip chains 3A and 3B and fed, a thickness direction thereof is a vertical direction (Z direction), a horizontal direction (X direction) thereof is the longitudinal direction (transport direction), and another horizontal direction (Y direction) thereof is the lateral direction.

As described above, the lateral edge of the film F is held by the clip chain 3A. The film F is held with holders (clampers) 9 provided at the clips 5 holding the edge in the thickness direction. Therefore, the lateral edge of the film F is held by the clampers 9 at plural positions along the longitudinal direction. Similarly, the other lateral edge of the film F is held by the clip chain 3B.

As show in FIG. 1, the clip chain 3A formed circularly is wound around sprockets SP, and traveled in a direction indicated by arrows A2. The clip chain 3B is also traveled in the direction indicated by the arrows A2. The clip chains 3 and the sprockets SP meshes at meshed portion provided on the clips 5 of the clip chains 3.

Both lateral edges of the film F are clamped by the clampers 9 at opposite sections (sections located at the both lateral edges of the film F in FIG. 1) of the clip chains 3A and 3B, and the film F is transported in this held state. Note that the film F is not clamped at other sections (sections away from the both lateral edges of the film F in FIG. 1) of the clip chains 3A and 3B.

Zones in which each edge if the film F is clamped by the clampers 9 and the film F is transported are segmented into a zone Z1, a zone Z2, a zone Z3, a zone Z4 and a zone Z5 from upstream to downstream of the transport direction of the film F. The zone Z1 is a pre-heat zone, the zone Z2 is a stretch zone (lateral stretch zone), the zone Z3 is a heat fixation zone, and the zones Z4 and Z5 are relaxation zones in which tensions of the film F are relaxed in the two directions (the lateral and longitudinal directions) of the film F. Note that, relaxation degree of the film F is made gradually large in the zone Z4, and kept almost constant in the zone Z5.

Here, the relaxation degree of the film F in the zones Z4 and Z5 will be explained in detail.

First, a lateral relaxation degree of the film F will be explained. The lateral relaxation degree of the film F is gradually made large as the film F is transported in the direction indicated by the arrows A1 (the distance between the clip chains 3A and 3B gradually narrows) in the zone Z4. On the other hand, the lateral relaxation degree of the film F is kept almost constant despite the transportation of the film F in the direction indicated by the arrows A1 (the distance between the clip chains 3A and 3B is almost constant) in the zone Z5.

Next, a longitudinal relaxation degree of the film F will be explained. The lateral relaxation degree of the film F is regulated by interval adjusting rails 13 (13A, 13B). The longitudinal relaxation degree of the film F in the zones Z4 and Z5 is kept almost constant. The longitudinal relaxation degree of the film F is regulated at a predetermined relaxation degree at a border between the zone Z3 and the zone Z4, and then this relaxation degree is kept in the zones Z4 and Z5.

Note that the longitudinal relaxation degree of the film F can be changed by changing an installation layout of the interval adjusting rails 13 accordingly. For example, the longitudinal relaxation degree of the film F may be made large in the zone Z4 as the film F is transported in the direction indicated by the arrows A1. Alternatively, the longitudinal tension of the film F may not be loosed in the zone Z4 without installing the interval adjusting rails 13 in the zone Z4.

The film stretching machine 1 will be explained in detail.

Figure 3:
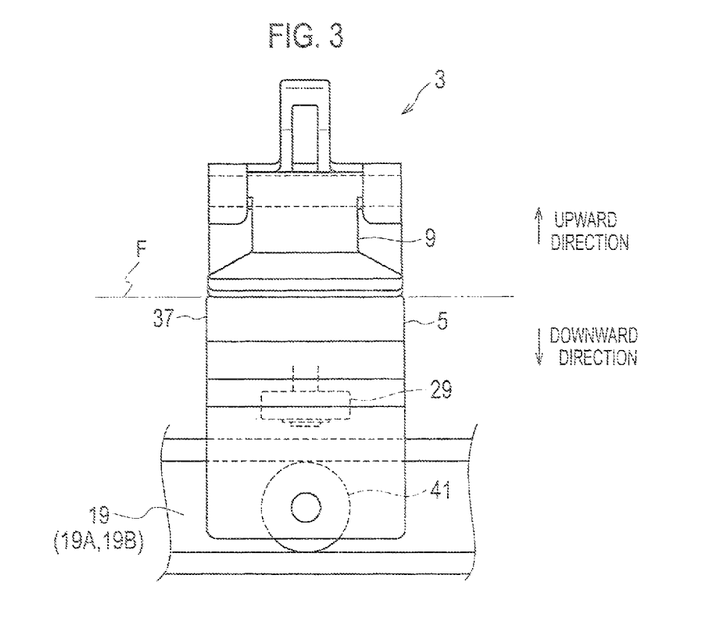
FIG. 3 is a front view of a clip.
Figure 4:
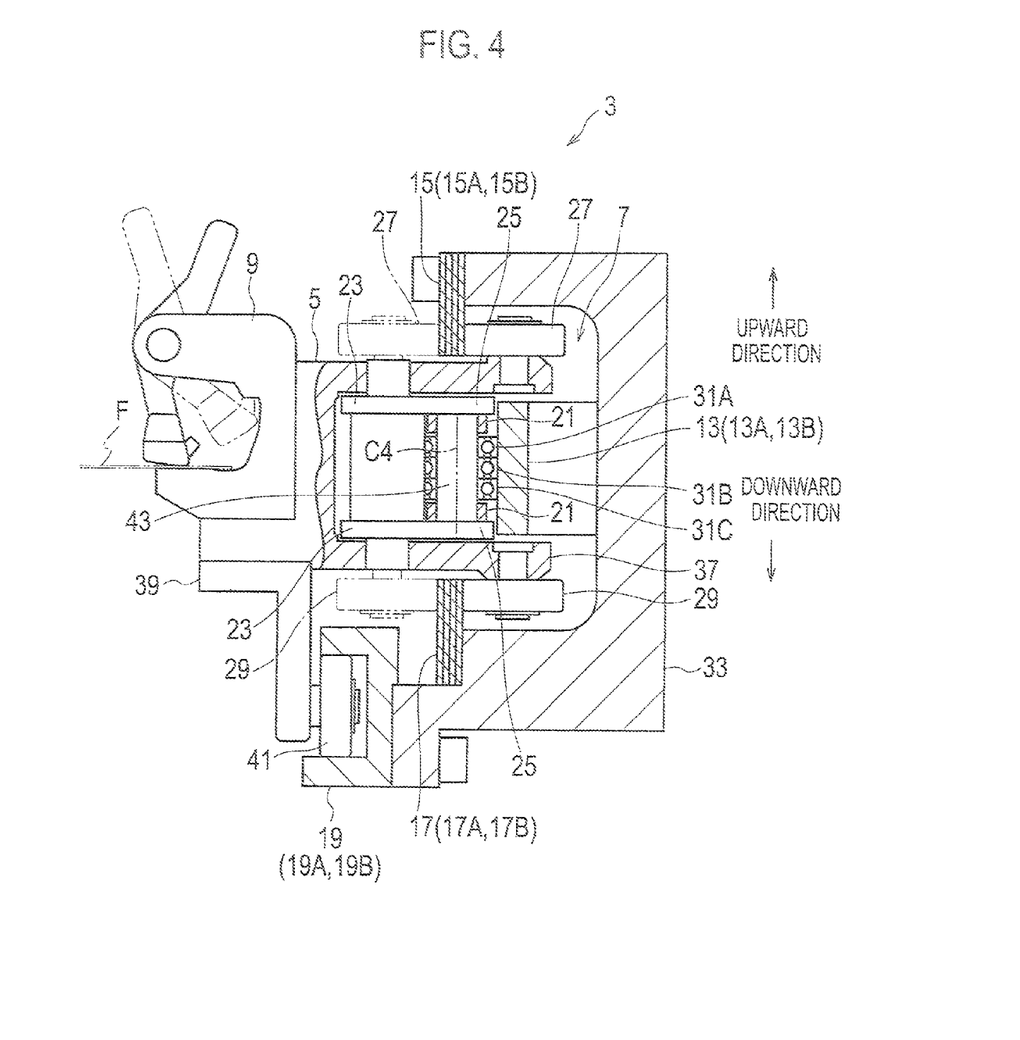
FIG. 4 is a cross-sectional view showing a schematic configuration of the clip and an interval adjusting link.
Figure 5:
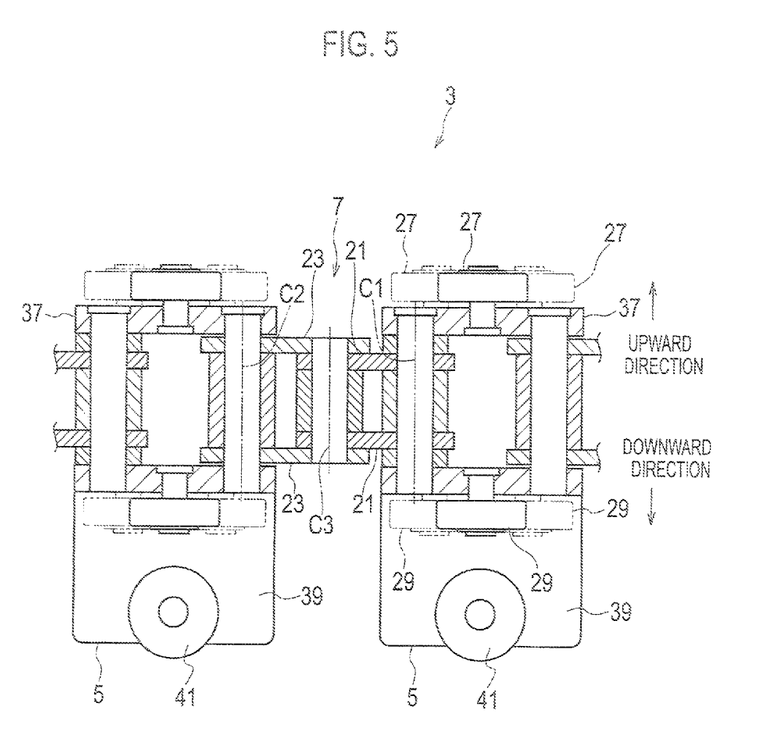
FIG. 5 is a cross-sectional view showing the schematic configuration of the clips and the interval adjusting link.

The film stretching machine 1 includes a frame (not shown) that is a base of the film stretching machine 1, upper reference rails 15 (15A, 15B), lower reference rails 17 (17A, 17B), and support rails 19 (19A, 19B) (see FIGS. 2 to 4).

The rails 15A, 17A and 19A are rails for guiding travel of the clip chain 3A. Therefore, the rails 15A, 17A and 19A are arranged circularly along the clip chain 3A shown in FIG. 1, and integrally provided with the above-mentioned frame.

The upper reference rail 15A is disposed on a lateral side of the film F held by the clip chain 3A at an upper side of the film F In addition, the upper reference rail 15A is disposed at an almost constant level in the vertical direction, and guides the travel of the clip chain 3A in the lateral and longitudinal direction of the film F. The film F is guided in the two-dimensional horizontal XY directions so as to be transported in the longitudinal direction and stretched in the lateral direction.

The lower reference rail 17A is disposed on the lateral side of the film F held by the clip chain 3A at a lower side of the film F like the upper reference rail 15A. clip chain 3A is traveled while guided at its upper and lower sides by the upper reference rail 15A and the lower reference rail 17A.

In addition, the upper reference rail 15A and the lower reference rail 17A are distanced away from the film F in the lateral direction and the thickness direction (vertical direction). Further, in the plan view, the upper reference rail 15A and the lower reference rail 17A are overlapped with each other. Therefore, the clip chain 3A travels smoothly while guided at the upper and lower sides The support rail 19A guides the travel of the clip chain 3A in the thickness direction (vertical direction) of the film F. The support rail 19A guides the clip chain 3A so that the clip chain 3A travels while keeping a constant level in the thickness direction.

As described above, the clip chain 3A is formed circularly by coupling the plural clips 5, each of which has a clamper 9 for clamping the film F by use of the interval adjusting links 7

The interval adjusting links 7 couple the neighboring clips 5 with each other in order to form the circular clip chain 3A. In addition, the interval adjusting links 7 contact with the interval adjusting rail 13A at a preset level in the height direction (vertical direction) to adjust intervals (for example, reducing the intervals).

The interval adjusting rail (pitch adjusting rail) 13A is also integrally provided with the above-mentioned frame. The interval adjusting rail 13A is disposed along the upper reference rail 15A (and the lower reference rail 17A) in order to adjust the intervals of the clips 5 of the clip chain 3A. In addition, the interval adjusting rail 13A is provided away from the upper reference rail 15A and the lower reference rail 17A in the vertical direction. For example, the interval adjusting rail 13A is provided at an almost center position in the vertical direction between the upper reference rail 15A and the lower reference rail 17A. Further, the interval adjusting rail 13A is provided integrally with the above-mentioned frame in at least a portion of sections (sections where the intervals of the clips 5 are adjusted; e.g. the zones Z4 and Z5) along the longitudinal direction of the upper reference rail 15A (and the lower reference rail 17A).

Note that the rails 15B, 17B, 19B and 13B are configured similarly to the rails 15A, 17A, 19A and 13A, respectively. And, the rails 15B, 17B, 19B and 13B are arranged symmetrically with the rails 15A, 17A, 19A and 13A, respectively, with respect to a vertical plane including a centerline of the film F in the lateral direction. Therefore, the clip chain 3A and the clip chain 3B travel symmetrically with respect to the vertical plane including the above-mentioned centerline.

Although the clip chain 3A will be explained hereinafter, the other clip chain 3B can be also recognized similarly to the clip chain 3A.

As shown in FIG. 2, the interval adjusting link 7 includes a first element 21 and a second element 23. A base end of the first element 21 is coupled with one of the neighboring clip 5 (right-side clip in FIG. 2) swingably about a vertically-extending axis C1. A tip end of the first element 21 is extended toward another of the neighboring clip 5 (left-side clip in FIG. 2).

A base end of the second element 23 is coupled with the other of the neighboring clip 5 (left-side clip in FIG. 2) swingably about a vertically-extending axis C2. A tip end of the second element 23 is extended toward the one of the neighboring clip 5 (right-side clip in FIG. 2). Then, the tip end of the second element 23 is coupled with the tip end of the first element 21 swingably about a vertically-extending axis C3.

Further, a protruded portion 25 is provided on the second element 23. The protruded portion 25 crosses a direction connecting the base end (axis C2) of the second element 23 with the tip end (axis C3) of the second element 23, and is protruded in a direction away from the film F. Here, the protruded portion 25 is provided integrally with a main body of the second element 23.

Then, the protruded portion 25 of the second element 23 contacts with the interval adjusting rail 13A to swing the elements 21 and 23, so that the interval between the neighboring clips 5 is adjusted to be reduced.

In addition, as shown in FIG. 4, a contact portion (roller 31) of the interval adjusting link 7 with the interval adjusting rail 13A is located at an almost center position in the vertical direction between the upper reference rail 15A (contact portions between the upper reference rail 15A and cam followers 27) and the lower reference rail 17A (contact portions between the lower reference rail 17A and cam followers 29).

Note that, in a state where the protruded portion 25 of the second element 23 does not contact with the interval adjusting rail 13A, a tensile force of the film F is applied to the elements 21 and 23 so as to extend the elements 21 and 23 in line, so that the interval between the neighboring clips 5 becomes maximum (FIG. 2). The swing center C1 for the first element 21, the swing center C2 for the second element 23 and the communal swing center C3 for the first element 21 and the second element 23 are aligned almost in line along the travel direction of the clip chain 3A. In addition, the protruded portion 25 is located at an opposite side to the holder (clamper) 9, with the swing centers C1, C2 and C3 of the elements 21 and 23 interposing therebetween.

Figure 6:
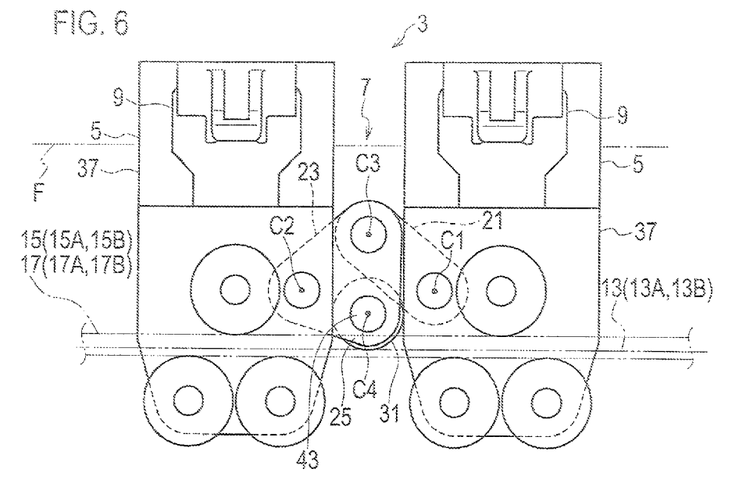
FIG. 6 is a plan view showing a state where a first element and a second element bend to each other and a distance between the clips becomes small.

As shown in FIG. 2, the protruded portion 25 is protruded from the base end of the second element 23 so as to cross the direction connecting the base end with the tip end of the second element 23 at a sharp angle α. The protruded portion 25 is extended toward the first element 21 obliquely. Then, when the protruded portion 25 contacts with the interval adjusting rail 13A as shown in FIG. 6, the protruded portion 25 is pushed by the interval adjusting rail 13A, so that the tip end of the first element 21 and the tip end of the second element 23 (the swing center C3) is moved toward a side of the film F (a side of the holder 9). As a result, the first element 21 and the second element 23 are folded at the swing center C3, so that the interval between the neighboring clips 5 is reduced.

Note that, here, the roller 31 is provided at a tip end of the protruded portion 25, and the roller 31 contacts with the interval adjusting rail 13A. The roller 31 is provided at the protruded portion 25 rotatably about a vertically-extending rotational center C4.

In addition, a distance between the swing center C1 and the swing center C3 is identical to a distance between the swing center C2 and the swing center C3. A distance between the swing center C2 and the rotational center C4 is smaller than the distance between the swing center C2 and the swing center C3.

Each of the upper reference rail 15A and the lower reference rail 17A is formed by laminating plural thin plates in a thickness direction of the plates as shown in FIG. 4. Therefore, it can be easy to form the upper reference rail 15A and the lower reference rail 17A circularly. Note that the clip chain 3A travels (the clips 5 move) in a direction perpendicular to a paper plane of FIG. 4.

In addition, the upper reference rail 15A and the lower reference rail 17A are integrally supported by a rail support member 33 that has an approximately C-beam shaped steel member. The rail support member 33 is integrally provided with the above-mentioned frame with its clamper 9 side open. A support rail 19A also has an approximately C-beam shaped steel member, and is provided integrally with the rail support member 33 at a lower side of the lower reference rail 17A.

The clip 5 includes a base body 37 that has an approximately C-beam shaped steel member. The cam followers 27 and 29 are provided on the base body 37. As shown in FIG. 2, the upper reference rail 15A is sandwiched by the three cam followers 27, and the clip 5 is guided horizontally by the upper reference rail 15A via the cam followers 27. Similarly, the lower reference rail 17A is sandwiched by the cam followers 29. The clip 5 is guided horizontally by the lower reference rail 17A via the cam followers 29.

In addition, a cam follower 41 is provided at the base body 37 via an angle bar 39 as shown in FIG. 4. The cam follower 41 fits into an inside of the support rail 19A. The clip 5 is guided vertically by the support rail 19A via the cam follower 41.

As described above, the roller 31 is rotatably provided at the protruded portion 25 of the second element 23 via a cylindrical pin 43. The roller 31 is composed of plural bearings 31A, 31B, and 31C aligned in an axial direction of the rotational center C4 (vertical direction). Therefore, at least one of the bearings contacts with the interval adjusting rail 13A when the roller 31 passes over a rail joint of the interval adjusting rail 13A, so that the elements 21 and 23 can be moved continuously. In a case where the rail joint of the interval adjusting rail 13A is made as a comb joint (shown as a Japanese Patent Application Laid-Open No. 2007-230143), at least one of the bearings 31A, 31B and 31C contacts with a surface of a portion other than the rail joint, the roller 31 can smoothly pass over the rail joint of the interval adjusting rail 13A, so that the film stretching machine 1 can be operated stably.

Next, operations of the film stretching machine 1 will be explained.

As shown in FIG. 1, the film F as an original web is fed out from an extruder or a feeder, and the film stretching machine 1 is operated to stretch the film F (with the clip chains 3A and 3B traveling synchronously).

At an entry of the zone Z1, the clampers 9 of the clips 5 clamp the film F.

The film F is stretched while the film F is transported from the zone Z1 to the zone Z5 with the clampers 9 clamping the film F.

Then, at an exit of the zone Z5, the clampers 9 release the film F. After this, the clips 5 move at opposite sides to the film F to return to the entry of the zone Z1, and then the clampers 9 clamp the film again.

According to the film stretching machine 1, the clips 5 are coupled by the interval adjusting links 7 and the intervals of the clips 5 are adjusted by contacting components (the rollers 31) of the interval adjusting links 7 with the interval adjusting rails 13, so that no complicated link mechanism is used and the configuration of the machine can be simplified.

In addition, according to the film stretching machine 1, the rollers 31 of the interval adjusting links 7 contact with the interval adjusting rails 13 at the preset level in the vertical direction, so that the configuration of the machine can be simplified and stretching degree of the film F can be easily adjusted.

In the film stretching machine disclosed in the Patent Document 2, a configuration is adopted in which the interval adjusting rails are provided at two upper and lower positions, and the rollers contact with these interval adjusting rails, respectively. Therefore, if a relative position between the upper interval adjusting rail and the lower interval adjusting rail is slightly misaligned, the intervals of clips becomes mismatched between the upper and the lower rails, so that stable operations cannot be achieved. The positions of the upper and lower interval adjusting rails must be adjusted in order to achieve stable operations, but these positional adjustments are difficult and take much time. Then, if the adjustments are not done accurately, the rollers contact with only one of the interval adjusting rails, so that lopsided wear may occur, and a life of the machine may become short.

On the contrary, in the film stretching machine 1 of the present embodiment, the interval adjusting rails are provided at only one position in the vertical direction, so that the above-mentioned difficult adjusting works are not needed, the stretching degree of the film F can be easily adjusted, and a life of the machine can be prolonged. Note that, since the upper reference rails 15 (15A, 15B) and the lower reference rails 17 (17A, 17B) are directly fixed to surfaces (e.g. surfaces finished with high accuracy by machining processes) of the rail support member 33 having high stiffness, they are installed with high accuracy.

In addition, according to film stretching machine 1, since the interval adjusting links 7 include the elements 21 and 23 that swing relating to the clips 5, a setting of the interval between the neighboring clips 5 can be changed by changing shapes of the elements 21 and 23 and thereby design options are expanded.

Further, according to the film stretching machine 1, since the contact portion (roller 31) of the interval adjusting link 7 with the interval adjusting rail 13 is located between the upper reference rail 15 and the lower reference rail 17, no large moment applies to the clips 5 and the interval adjusting link 7 due to an external force even when the external force applies to the clips 5 and the interval adjusting link 7, and thereby the clip chain 3 can be traveled in a stable state.

Second Embodiment

Figure 7:
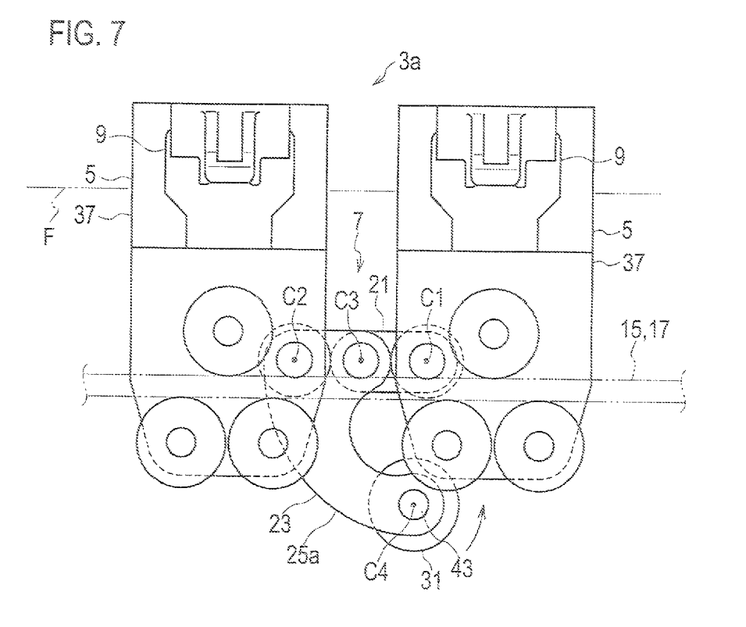
FIG. 7 is a plan view showing a schematic configuration of a clip chain in a film stretching machine according to a second embodiment of the present invention.
Figure 8:
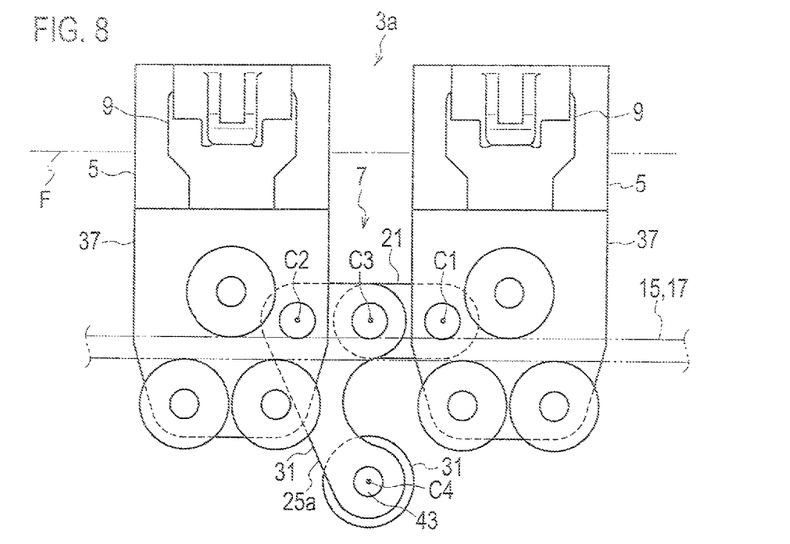
FIG. 8 is a plan view showing a modified example of the clip chain used in the film stretching machine according to the second embodiment.

In the film stretching machine according to the second embodiment, as shown in FIG. 7 or 8, a shape of a protruded portion 25a of the interval adjusting link 7 is different from that of the protruded portion 25 in the first embodiment. Other elements are configured similarly to those in the film stretching machine 1 according to the first embodiment.

In the film stretching machine according to the second embodiment, the protruded portion 25a of the interval adjusting links 7 is protruded longer than the protruded portion 25 in the first embodiment. The roller 31 is provided at a tip end of the protruded portion 25*a*. Then, the distance between the swing center C2 and the rotational center C4 are made larger than the distance between the swing center C3 and the swing center C3.

As described above, since the distance between the swing center C2 and the rotational center C4 are made larger than the distance between the swing center C3 and the swing center C3, a force for adjusting the interval between the neighboring clips 5 can be amplified due to the principle of leverage. As a result, while a contacting pressure between the interval adjusting rail 13 and the roller 31 can be prevented from increasing, the interval between the neighboring clips 5 can be adjusted surely with high accuracy.

Note that, although the protruded portion 25*a* in the interval adjusting link 7 shown in FIG. 7 is protruded curvedly, the protruded portion 25*a* in the interval adjusting link 7 shown in FIG. 8 is protruded linearly.

Third Embodiment

Figure 9:
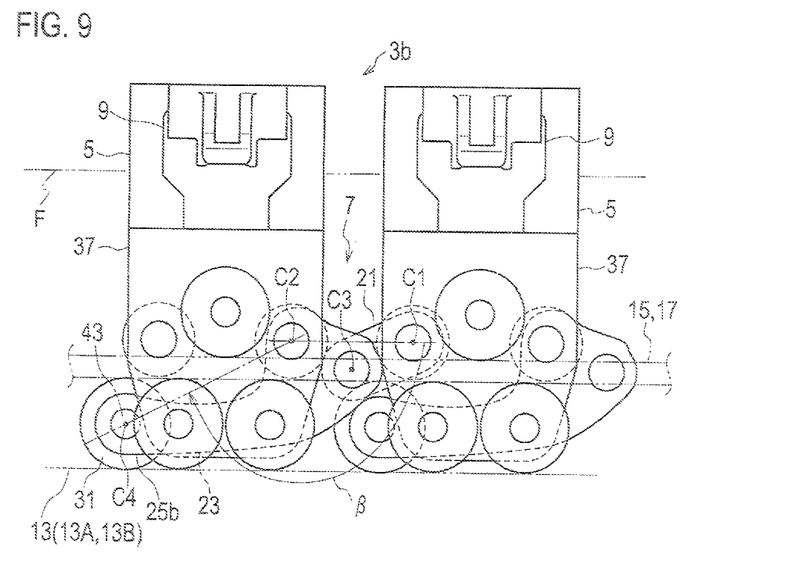
FIG. 9 is a plan view showing a schematic configuration of a clip chain in a film stretching machine according to a third embodiment of the present invention.

In the film stretching machine according to the third embodiment, as shown in FIG. 9, a protruded direction of a protruded portion 25*b* of the interval adjusting link 7 is different from that of the protruded portion 25*a* in the second embodiment. Other elements are configured similarly to those in the film stretching machine according to the second embodiment.

In the film stretching machine according to the third embodiment, the protruded portion 25*b* of the interval adjusting links 7 is extended toward a side away from the first element 21 along the longitudinal direction of the film F. In other words, a straight line connecting the rotational center C4 and the swing center C2 crosses a straight line connecting the swing center C2 and the swing center C1 at an obtuse angle β.

When the roller 31 of the protruded portion 25*b* contacts with the interval adjusting rail 13, the protruded portion 25*b* is pushed by the interval adjusting rail 13 and the tip end of the first element 21 and the tip end of the second element 23 (the swing center C3) are moved toward a side away form the film F (the holders 9 of the clips 5). As a result, as shown in FIG. 9, the first element 21 and the second element 23 are folded at the swing center C3 to reduce the interval between the neighboring clips 5.

As described above, the elements 21 and 23 are folded toward an opposite side to the holders 9 to adjust the interval between the neighboring clips 5, so that an adjustable range of the interval between the neighboring clips 5 can be enhanced while the element 21 and 23 are prevented from contacting with the clips 5.

Fourth Embodiment

In the film stretching machine according to the fourth embodiment, a shape of the interval adjusting link 7 is different from that of the interval adjusting link 7 in the first embodiment. Other elements are configured similarly to those in the film stretching machine 1 according to the first embodiment.

Figure 10:
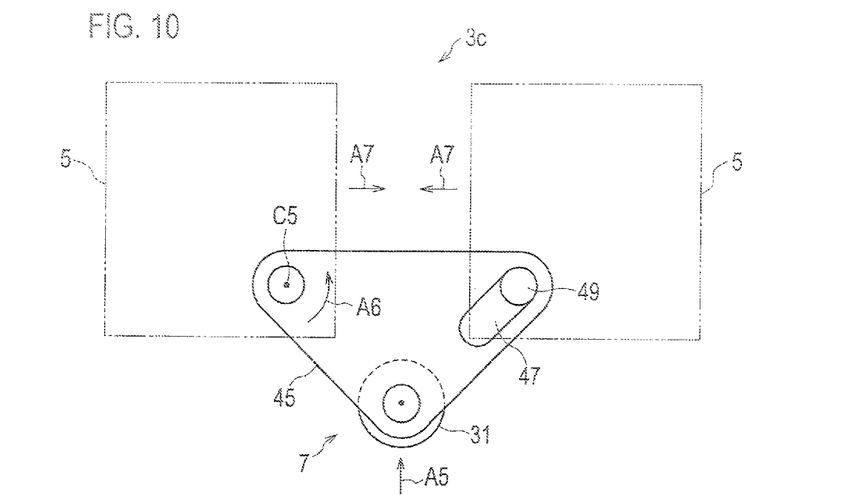
FIG. 10 is a plan view showing a schematic configuration of a clip chain in a film stretching machine according to a fourth embodiment of the present invention.

In the film stretching machine according to the fourth embodiment, the interval adjusting link 7 includes a swing member 45. One side of the swing member 45 is coupled with one of the neighboring clips 5 swingably about an axial C5 extending vertically. In addition, another side of the swing member 45 is coupled with another of the neighboring clips 5 slidably.

The swing member 45 receives a force indicated by an arrow A5 when a portion (the roller 31) of the swing member 45 contacts with the interval adjusting rail 13. The swing member 45, when receiving the force indicated by the arrow a5, is swung in a direction indicated by an arrow A6. As a result, the clips 5 are moved in directions indicated by arrows A7 to adjust the interval between the clips 5.

Note that the coupling between the other side of the swing member 45 and the other of the clips 5 is configured by engaging a boss 49 provided integrally on the clip 5 with an elongated hole 47 formed on the other side of the swing member 45, so that the boss 49 slides in a longitudinal direction of the elongate hole 47.

Fifth Embodiment

In the film stretching machine according to the fifth embodiment, a shape of the interval adjusting link 7 is different from that of the interval adjusting link 7 in the first embodiment. Other elements are configured similarly to those in the film stretching machine 1 according to the first embodiment.

Figure 11:
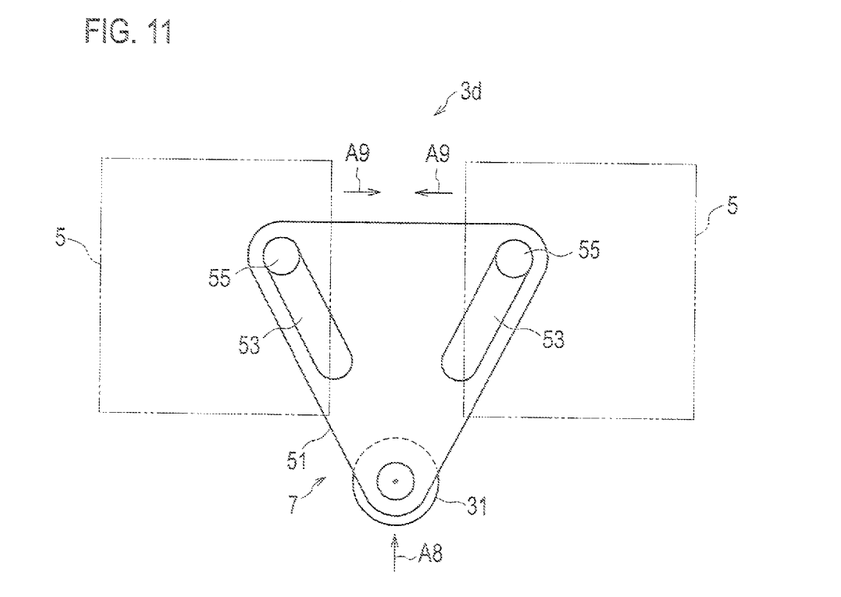
FIG. 11 is a plan view showing a schematic configuration of a clip chain in a film stretching machine according to a fifth embodiment of the present invention.

In the film stretching machine according to the fifth embodiment, the interval adjusting link 7 includes a moving member 51. One side of the moving member 51 is coupled with one of the neighboring clips 5 linearly-movably with angled to both of the lateral and longitudinal directions of the film F (e.g. via a liner guide bearing (not shown)). Similarly, another side of the moving member 51 is coupled with another of the neighboring clips 5 linearly-movably.

The moving member 51 receives a force indicated by an arrow A8 when a portion (the roller 31) of the moving member 51 contacts with the interval adjusting rail 13. As a result, the clips 5 are moved in directions indicated by arrows A9 to adjust the interval between the clips 5.

Note that, similarly to the fourth embodiment, the couplings between the moving member 51 and the clips 5 are configured of elongate holes 53 and bosses 55.

Note that the interval adjusting rails 13 (13A, 13B) in the above embodiments may be provided not only in the zones Z4 and Z5 but also in other zones Z1 to Z3.

For example, if the interval adjusting rails 13 (13A, 13B) are provided in the pre-heat zone Z1, slack of the film F that may occur due to heating can be absorbed. In addition, if the interval adjusting rails 13 (13A, 13B) are provided at the entry or the exit of the stretch zone Z2, a change of the interval between the clips 5 near curved segments of the reference rails 15 and 17 at the entry (start of stretching) or the exit (end of stretching) of the stretch zone Z2 can be corrected.

In addition, although the clips 5 for clamping the film F are moved from left to right in FIGS. 2, 6, 6, 7, 8 and 9, they may be moved from right to left in some embodiments.

The above-described film stretching machine is an example of a stretching machine that includes a clip chain for holding a lateral edge of a film and stretches the film while transporting the film with the clip chain holding the film and traveling, and includes an upper reference rail disposed at an upper side for guiding the clip chain; a lower reference rail disposed at a lower side for guiding the clip chain; a plurality of clips that constitutes the clip chain; an interval adjusting rail for adjusting intervals of the plurality of clips; and interval adjusting links that couple neighboring clips among the plurality of clips and contact with the interval adjusting rail to adjust the intervals of the plurality of clips.

The invention claimed is:

1. A film stretching machine comprising:
a clip chain for holding a lateral edge of a film while traveling and thereby transporting and stretching the film, the clip chain comprising a plurality of clips and a plurality of interval adjusting links that couple neighboring clips among the plurality of clips to one another;
an upper reference rail disposed at an upper side of the clip chain for guiding the upper side of the clip chain while the clip chain travels;
a lower reference rail disposed at a lower side of the clip chain for guiding the lower side of the clip chain while the clip chain travels; and
an interval adjusting rail for adjusting intervals of the plurality of clips, the interval adjusting rail being disposed between the upper reference rail and the lower reference rail;
wherein the interval adjusting links contact with the interval adjusting rail to adjust the intervals of the plurality of clips.

2. The film stretching machine according to claim 1, wherein,
a thickness direction of the film is set in a vertical direction, one horizontal direction of the film is set in a longitudinal direction, and another horizontal direction of the film perpendicular to the one horizontal direction is set in a lateral direction,
the clip chain is provided in a plurality and comprises a first clip chain for holding one lateral edge of the film at plural positions along the longitudinal direction while traveling and thereby transporting and stretching the film and a second clip chain for holding another lateral edge of the film at plural positions along the longitudinal direction while traveling and thereby transporting and stretching the film, the first clip chain comprising a plurality of first clips and a plurality of first interval adjusting links that couple neighboring clips among the plurality of first clips to one another, and the second clip chain comprising a plurality of second clips and a plurality of second interval adjusting links that couple neighboring clips among the plurality of second clips to one another,
the upper reference rail is provided in a plurality and comprises a first upper reference rail for guiding the first clip chain and a second upper reference rail for guiding the second clip chain,
the lower reference rail is provided in a plurality and comprises a first lower reference rail for guiding the first clip chain and a second lower reference rail for guiding the second clip chain,
the interval adjusting rail is provided in a plurality and comprises a first interval adjusting rail for adjusting intervals of the plurality of first clips and a second interval adjusting rail for adjusting intervals of the plurality of second clips, the first interval adjusting rail being disposed between the first upper reference rail and the first lower reference rail, and the second interval adjusting rail being disposed between the second upper reference rail and the second lower reference rail, and
wherein the first interval adjusting links contact with the first interval adjusting rail to adjust the intervals of the plurality of first clips, and the second interval adjusting links contact with the second interval adjusting rail to adjust the intervals of the plurality of second clips.

3. The film stretching machine according to claim 1, wherein
each of the interval adjusting links includes a swing member, one side of the swing member being swingably coupled with one of the neighboring clips, and another side of the swing member being coupled with another of the neighboring clips, and
the swing member swings when a portion of the swing member contacts with the interval adjusting rail to adjust the intervals of the plurality of clips.

4. The film stretching machine according to claim 1, wherein
each of the interval adjusting links includes a moving member, one side of the moving member being movably coupled with one of the neighboring clips, and another side of the moving member being movably coupled with another of the neighboring clips, and
the moving member moves when a portion of the moving member contacts with the interval adjusting rail to adjust the intervals of the plurality of clips.

5. The film stretching machine according to claim 1, wherein
each of the interval adjusting links includes a first element provided between the neighboring clips, each first element comprising a base end and a tip end,
each of the interval adjusting links includes a second element provided between the neighboring clips, each second element comprising a base end, a tip end and a protruded portion,
the base end of each first element is swingably coupled with one of the neighboring clips, and the tip end of each first member is extended toward a side of another of the neighboring clips,
the base end of each second element is swingably coupled with the other of the neighboring clips, and the tip end of each second member is extended toward a side of the one of the neighboring clips and swingably coupled with the tip end of the first element,
the protruded portion on each second element protrudes from the base end of the second element in a direction that crosses a direction connecting the base end and the tip end of the second element, and
each first and second element swings when the protruded portion of each second element contacts with the interval adjusting rail to adjust the interval of the neighboring clips.

6. The film stretching machine according to claim 5, wherein
a roller that contacts with the interval adjusting rail is provided at a tip end of the protruded portion of each interval adjusting link, and
a distance between a swing center of the second element on the other of the neighboring clips and a rotational center of the roller of each interval adjusting link is set larger than a distance between the swing center of the second element on the other of the neighboring clips and a communal swing center of the first and second elements of each interval adjusting link.

7. The film stretching machine according to claim 5, wherein
the protruded portion of each interval adjusting link is pushed by the interval adjusting rail when contacting with the interval adjusting rail, and the tip end of the first element of each interval adjusting link and the tip end of the second element of each interval adjusting link is moved toward a side away from the film to reduce the interval of the neighboring clips.

8. The film stretching machine according to claim 1, wherein
   a contact portion of the interval adjusting link with the interval adjusting rail is located between the upper reference rail and the lower reference rail in a vertical direction.

9. A film stretching method comprising stretching a film utilizing the film stretching machine according to claim 1.

* * * * *